(12) United States Patent
Massascusa et al.

(10) Patent No.: US 12,530,179 B2
(45) Date of Patent: Jan. 20, 2026

(54) METHODS AND APPARATUS FOR SUPPORTING SECONDARY PLATFORM BUNDLES

(71) Applicant: STMicroelectronics S.r.l., Agrate Brianza (IT)

(72) Inventors: Sofia Massascusa, Caserta (IT); Giulio Follero, Pozzuoli (IT); Marco Alfarano, Naples (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 118 days.

(21) Appl. No.: 18/039,164

(22) PCT Filed: Dec. 6, 2021

(86) PCT No.: PCT/IB2021/061355
§ 371 (c)(1),
(2) Date: May 26, 2023

(87) PCT Pub. No.: WO2022/144636
PCT Pub. Date: Jul. 7, 2022

(65) Prior Publication Data
US 2024/0296032 A1    Sep. 5, 2024

(30) Foreign Application Priority Data
Dec. 29, 2020 (IT) .................... 102020000032615

(51) Int. Cl.
*G06F 8/41* (2018.01)
*G06F 8/76* (2018.01)

(52) U.S. Cl.
CPC ............... *G06F 8/447* (2013.01); *G06F 8/76* (2013.01)

(58) Field of Classification Search
CPC .................................. G06F 8/76; G06F 8/447
(Continued)

(56) References Cited

U.S. PATENT DOCUMENTS 12,341,815 B2 * 6/2025 Van Nieuwenhuyze .................... H04W 12/40
2001/0047393 A1 * 11/2001 Arner ...................... G06F 9/452
709/216

(Continued)

FOREIGN PATENT DOCUMENTS

EP            2894561  A1     7/2015
EP            3648493  A1 *   5/2020    ........... H04L 63/062
WO    WO-2019210461 A1 *    11/2019    ........... H04W 12/086

OTHER PUBLICATIONS

Secure Personalization of a Chip Comprising a Secure Execution Environment Such as IUICC, ISSP or TEE (Year: 2020).*
(Continued)

*Primary Examiner* — Ziaul A Chowdhury
(74) *Attorney, Agent, or Firm* — Slater Matsil, LLP

(57) ABSTRACT

A method includes compiling, by a compiler of a Smart Secure Platform (SSP) supporting a Primary Platform and a Secondary Platform, source code comprising an implementation of an operating system of the Secondary Platform and applications of the Secondary Platform, to produce compiled source code compatible by an operating system of the Primary Platform; linking, by the compiler, personalization data to the compiled source code to produce a native Secondary Platform Bundle (SPB) compatible with the Primary Platform, the personalization data being associated with a subscription of a user of the SSP; and delivering, by the compiler, the native SPB.

20 Claims, 10 Drawing Sheets

(58) Field of Classification Search
USPC .......................................................... 717/153
See application file for complete search history.

(56) References Cited

U.S. PATENT DOCUMENTS

| | | | |
|---|---|---|---|
| 2015/0199187 A1* | 7/2015 | Hausner | G06F 8/48 |
| | | | 717/140 |
| 2017/0052780 A1* | 2/2017 | Clevenger | G06F 8/36 |
| 2020/0162247 A1* | 5/2020 | Nix | H04L 9/0841 |
| 2020/0264857 A1 | 8/2020 | Koo et al. | |
| 2021/0126801 A1* | 4/2021 | Nix | G06F 7/588 |

OTHER PUBLICATIONS

Wireless Network Service Access Control With Subscriber Identity Protection (Year: 2019).*

ETSI Technical Committee, "Smart Card Platform (TC SCP), TC SCP Ad-Hoc AH1, Online, Sep. 14-15, 2020, Draft Report," ETSI TC SCPREQ #83, Online Sep. 21-22, 2020, SCPREQ(20)000079, 7 pages.

ETSI TS 103 465, Technical Specification, "Smart Cards; Smart Secure Platform (SSP); Requirements Specification, (Release 16)," V16.2.0, Jun. 2020, 51 pages.

Google, "SPB interoperability Discussion paper—Proposal for SPB interoperability," SCP(20)000123, Sep. 2020, 8 pages.

SCP REQ, ETSI SCP #96, "SPB Binary Interoperability," Nov. 3-4, 2020, On Line, 5 pages.

SCP TEC, "Discussion paper on Secondary Platform Bundle interoperability," ETSI TC SCP Meeting #94, Online, Jul. 28-29, 2020, 2 pages.

* cited by examiner

METHODS AND APPARATUS FOR SUPPORTING SECONDARY PLATFORM BUNDLES

CROSS-REFERENCE TO RELATED APPLICATIONS

This application is a national stage of International Application No. PCT/IB2021/061355, filed on Dec. 6, 2021, which claims priority to Italian Application No. 102020000032615, filed on Dec. 29, 2020, which applications are hereby incorporated by reference herein in their entirety.

TECHNICAL FIELD

The present disclosure relates generally to Platform Bundles and, in particular embodiments, to a method for supporting Secondary Platform Bundles.

BACKGROUND

Smart Secure Platform (SSP) is an open secure platform proposed by the European Telecommunications Standards Institute (ETSI) that supports multiple applications with multiple physical interfaces. SSP is highly secure and scalable that is optimized for many requirements, from Internet of Things (IoT) applications to complex solutions, such as banking, payments, ID management, and access to mobile networks.

However, the flexibility of SSP also presents a problem with interoperability. SSP may be represented in several main parts: a Primary Platform, and a Secondary Platform. The Primary Platform comprises a hardware platform with a low-level operating system that manages resources of the hardware platform. The Secondary Platform includes a software platform utilizing the Primary Platform through an interface and contains a high-level operating system. The Secondary Platform also includes SSP applications that include personalization data and applications that run on top of the high-level operating system. A Secondary Platform, along with its SSP applications, is referred to as a Secondary Platform Bundle (SPB).

Currently, there is no standardization of the Primary Platform or the Secondary Platform to enable interoperability between the SPBs and the Primary Platforms manufactured by different Primary Platform manufacturers. This results in service providers having to provide different versions of SPBs for each different Primary Platform. Therefore, it would be advantageous to have methods and apparatus for supporting SPBs.

SUMMARY

In accordance with an embodiment, a method is provided. The method includes: compiling, by a compiler of a Smart Secure Platform (SSP) supporting a Primary Platform and a Secondary Platform, source code including an implementation of an operating system of the Secondary Platform and applications of the Secondary Platform, to produce compiled source code compatible by an operating system of the Primary Platform; linking, by the compiler, personalization data to the compiled source code to produce a native Secondary Platform Bundle (SPB) compatible with the Primary Platform, the personalization data being associated with a subscription of a user of the SSP; and delivering, by the compiler, the native SPB.

In accordance with an embodiment, a method is provided. The method including: tokenizing, by a subscription maker, source code including an implementation of an operating system an implementation of an operating system of a Secondary Platform and applications of the Secondary Platform to produce tokenized source code; tokenizing and filling, by the subscription maker, personalization data associated with a subscription of a user of a Smart Secure Platform (SSP) supporting the Primary Platform and the Secondary Platform, thereby producing tokenized personalization data; generating, by the subscription maker, an interoperable Secondary Platform Bundle (SPB) in accordance with the tokenized source code and the tokenized personalization data, the interoperable SPB meeting an interoperability scheme for the Secondary Platform and a Primary Platform; and delivering, by the subscription maker, the interoperable SPB.

In accordance with an embodiment, a Smart Secure Platform (SSP) supporting a Primary Platform and a Secondary Platform is provided. The SSP including: one or more processors; and a non-transitory memory storage including instructions that, when executed by the one or more processors, cause the SSP to: compile source code including an implementation of an operating system of the Secondary Platform and applications of the Secondary Platform to produce compiled source code compatible by an operating system of the Primary Platform; link personalization data to the compiled source code to produce a native Secondary Platform Bundle (SPB) compatible with the Primary Platform, the personalization data being associated with a subscription of a user of the SSP; and deliver the native SPB.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

In the ensuing description one or more specific details are illustrated, aimed at providing an understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

The European Telecommunications Standards Institute (ETSI) has proposed Smart Secure Platform (SSP) as an open secure platform to support multiple applications with multiple physical interfaces. SSP is highly secure and scalable that is optimized for many requirements, from Internet of Things (IoT) applications to complex solutions, such as banking, payments, ID management, and access to mobile networks. The definition of the SSP collects security requirements to support new technologies as Fifth Generation (5G) network features. The architecture of the SSP has been projected to support multiple markets, not only the telecommunications market.

Figure 1:
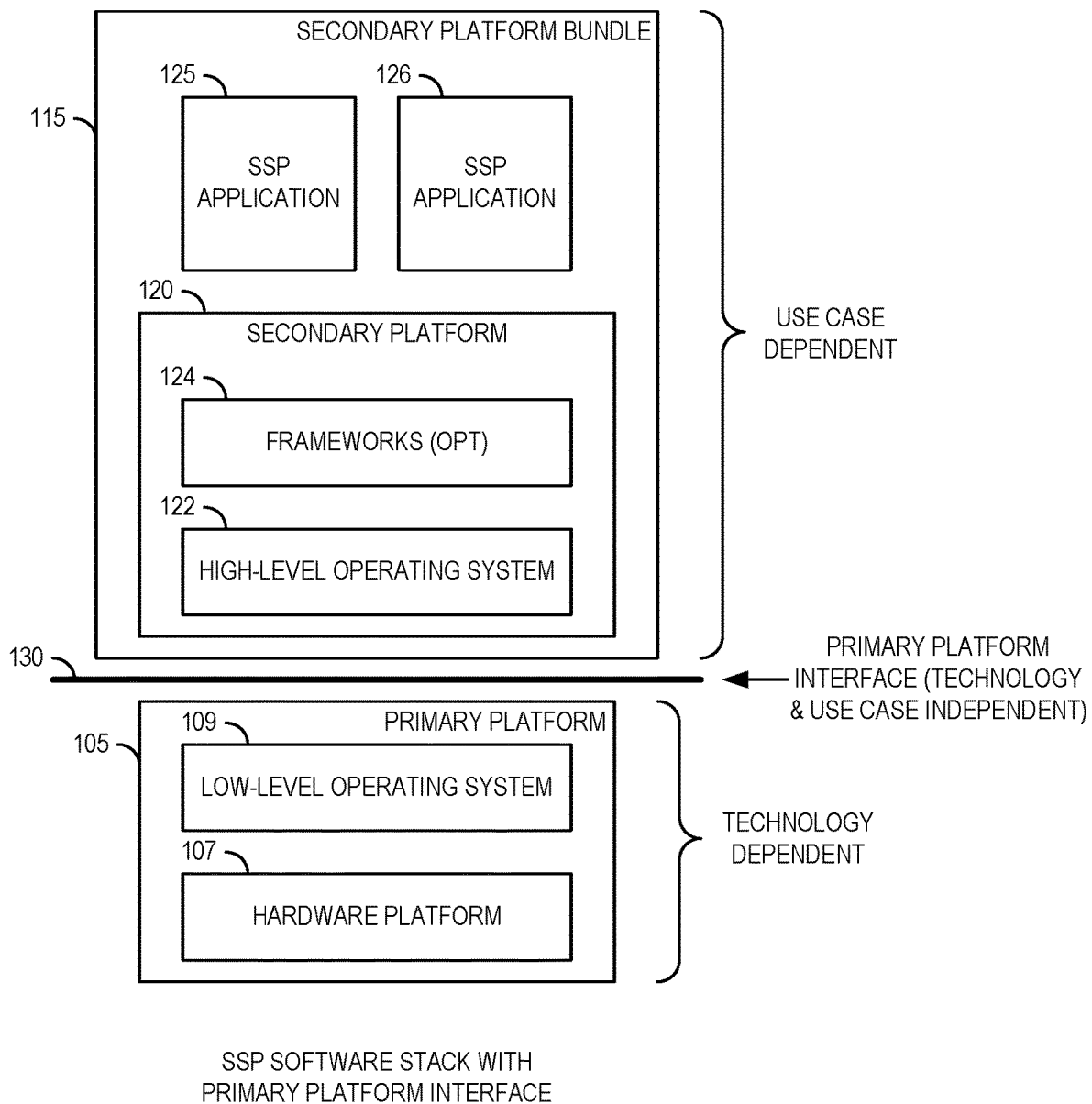
FIG. 1 illustrates a high-level view of a prior art smart secure platform (SSP)

FIG. 1 illustrates a high-level view of a prior art SSP 100. SSP 100 may be represented as a Primary Platform 105 and a Secondary Platform Bundle (SPB) 115, with Primary Platform 105 comprising a hardware platform 107 with a low-level operating system 109, which manages resources of hardware platform 107. SSP 100, as specified by ETSI, is generally technology dependent and can differ based on manufacturer. As an example, a first Primary Platform offered by a first vendor and a second Primary Platform offered by a second vendor may have different resources and capabilities.

SPB 115 comprises a Secondary Platform 120 and SSP applications 125-126. Secondary Platform 120 is a software platform that utilizes Primary Platform 105 through a Primary Platform interface 130. The software platform of Secondary Platform 120 is executed by the hardware of Primary Platform 105. Typically a software platform targets a specific hardware platform, e.g., hardware platform 107 of Primary Platform 105. The incompatibility between a software platform and a hardware platform may be due to differences in instruction set, hardware architecture, memory model, etc.

Primary Platform interface 130 serves as the interface between Secondary Platform 120 and Primary Platform 105. Primary Platform interface 130 is technology independent and use case independent, while Primary Platform 105 is technology dependent. The technology dependence aspect of Primary Platform 105 depends upon the hardware (i.e., hardware platform 107) of Primary Platform 105.

SSP applications 125-126 execute on high-level operating system 122 of Secondary Platform 120, which manages the resources of Secondary Platform 120, while Primary Platform interface 130 serves as the interface between Secondary Platform 120 and the hardware resources of Primary Platform 105.

SSP applications 125-126 comprise personalization data and applications that are executing on high-level operating system 122 of Secondary Platform 120. SSP applications 125-126 may range from relatively simple, such as Internet of Things (IoT) applications, to complex, such as banking, payments, ID management, and access to mobile networks.

Figure 2:
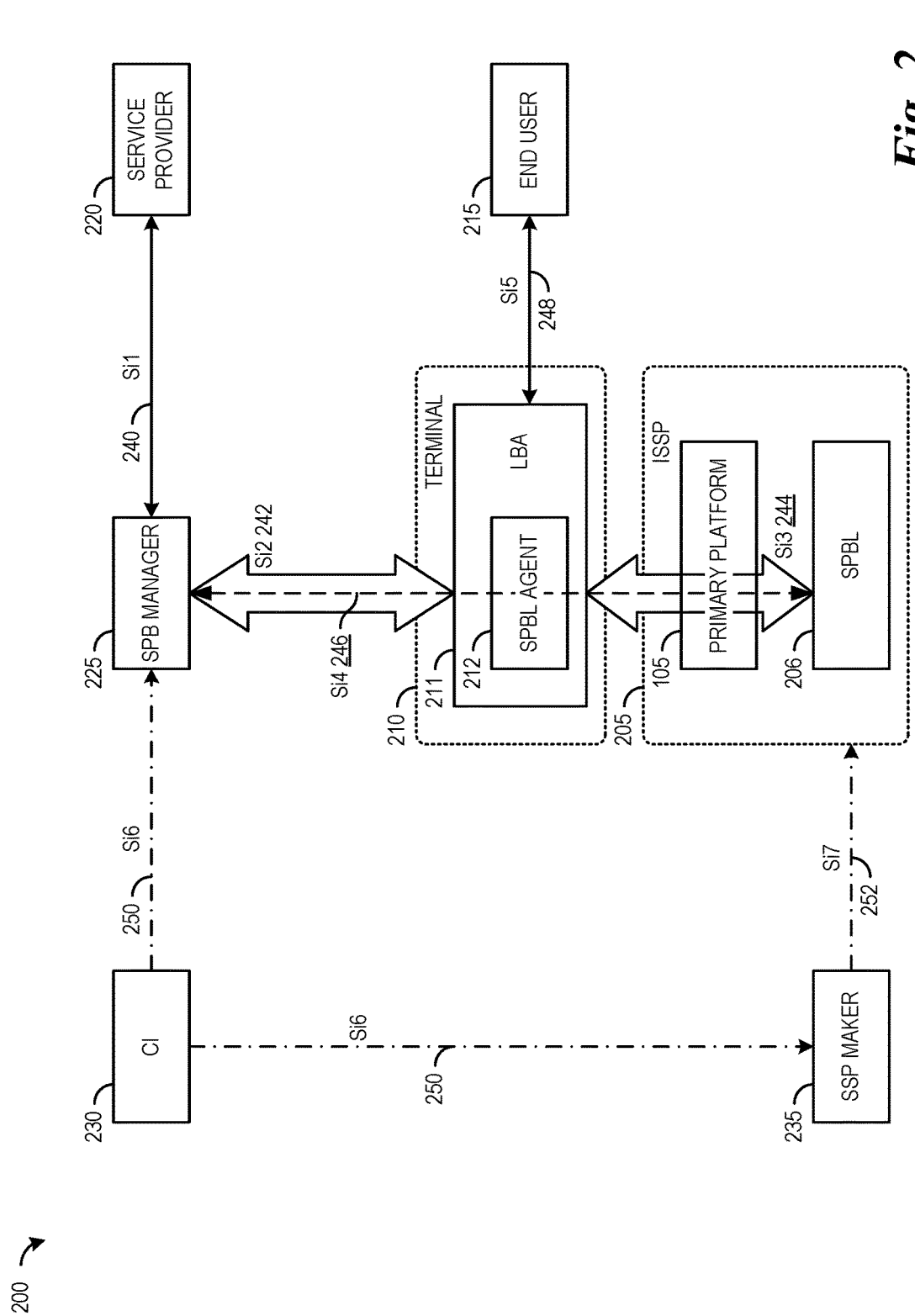
FIG. 2 illustrates a detailed view of a prior art integrated SSP (iSSP) environment.

FIG. 2 illustrates a detailed view of a prior art integrated SSP (iSSP) environment 200. iSSP environment 200 includes an iSSP 205, a terminal 210, an end user 215 utilizing terminal 210 to execute the SSP application to access a service, a service provider 220 providing requirements of SPB and requests SPB Manager 225 to prepare SPBs for iSSP 205, a SPB Manager 225 generating a SPB according to instructions from service provider 220, and a certificate issuer (CI) 230. SPB Loader (SPBL) 206 is an entity contained in iSSP 205 and loads SPB bundles on Primary Platform 105 for execution.

Terminal 210 includes a Local Bundle Assistant (LBA) 211 that communicates with SPB Manager 225 and transfers bound SPBs to SPBL 206. LBA 211 may also perform local management of SPBs with assistance of SPBL 206. A SPBL Agent 212, implemented in LBA 211, for example, controls the transfer of the SPBs to SPBL 206.

Interfaces in iSSP environment 200 include:
Si1 240: Used by service provider 220 to request SPB Manager 225 to prepare a SPB for a target iSSP (e.g., iSSP 205). May also be used by SPB Manager 225 to send notifications to service provider 220 regarding SPB provisioning or management operations.

Si2 242: Used by SPB Manager 225 and LBA 211 to provide transport of bound SPBs and management commands on SPBs installed in iSSP 205. May also be used by LBA 211 to send notifications to SPB Manager 225 regarding SPB provisioning or management operations.

Si3 244: Used between LBA 211 and SPBL 206 to transfer bound SPBs and management commands to SPBL 206.

Si4 246: Used to provide authorization, mutual authentication, integrity, and confidentiality for loading of bound SPBs. May be tunneled through LBA 211 using interfaces Si2 242 and Si3 244.

Si5 248: Used to initiate local management functions of LBA 211 by end user 215.

Si6 250: Used by SPB Manager 225 and SSP maker 235 to request certificate signing.

Si7 252: Interface between SSP maker 235 and iSSP 205.

As discussed above, SPB 115 is a software platform that executes on Primary Platform 105. The standardization by ETSI does not provide for interoperability between Primary Platforms manufactured by different Primary Platform manufacturers and SPBs. The lack of interoperability results in significant issues. As an example, in mobile network access applications, mobile network operators (MNOs) would have to provide different versions of each SPB for each different Primary Platform. This would require a great amount of computational resources (to generate the different versions of the SPBs), network resources (to deliver the different versions of the SPBs), and memory resources (to store the different versions of the SPBs).

Interoperability between the SPBs and the Primary Platforms would simplify the requirements for SPB Manager 225 because SPB Manager 225 would not need to provide bound SPBs for each different Primary Platform.

Therefore, there is a need for methods and apparatus supporting platform bundles interoperability. The methods and apparatus do not require standardization or modification to an existing standard, so development and acceptance can be significantly faster than processes that involve standardization.

According to an example embodiment, a multi-phase process for transforming a SPB that is non-interoperable with the Primary Platform into a native SPB that is compatible with the Primary Platform is provided. The multi-phase process involves generating an interoperable SPB and compiling the interoperable SPB into a native SPB executable on the Primary Platform.

In an embodiment, a first phase includes generating an interoperable SPB meeting a multi-step process to produce an interoperable format of SPB (which is referred to herein as an interoperability scheme). Examples of the multi-step process usable in producing SPBs in an interoperable format are provided below, including those shown in FIGS. 7, 8, 9, 10, and 11 presented below. The interoperable SPB includes source code and data structures compatible with the Primary Platform. The interoperable SPB also includes personalization data associated with subscriptions of the end users. The personalization data may include information regarding the subscriptions of the end users, the subscription types, the subscription levels, personal information of the end users, personal information number (PIN), cryptography keys, Public Key Infrastructure (PKI) Certificates, and so on. The first phase also includes ciphering the interoperable SPB.

In an embodiment, the source code of the SPB is tokenized. Tokenization of the source code may involve substituting keywords of the source code with specific tokens. Tokenization of the source code may reduce the size of the source code in a consistent manner. A tokenizer is used to tokenize the source code. The tokenized source code may be referred to as tokenized logic. Alternatively, a bytecode is used to encode the keywords of the source code. When bytecode is used, the keywords are replaced with compact numeric codes, constants, or references. In addition, the bytecode solution implies the definition of a specific bytecode format.

In an embodiment, the personalization data of the SPB is tokenized. When the personalization data is organized as a separate code in terms of only association statements, tokenizing the personalization data may be similar to the tokenizing of the source code, as discussed above. Alternatively, a bytecode is used to encode the personalization data.

In an embodiment, the source code (or the tokenized logic) of the SPB and the personalization data (or the tokenized personalization data) are combined to produce the interoperable SPB. Combining the source code and the personalization data produces the interoperable SPB that is associated with a specific subscription of the end user.

In an embodiment, the source code (or the tokenized logic) of the interoperable SPB is ciphered. The ciphering of the source code provides protection for the source code, preventing the ciphered source code from being exposed and potentially being compromised. In an embodiment, the personalization data (or the tokenized personalization data) of the interoperable SPB is ciphered. The ciphering of the personalization data provides protection for the personalization data, preventing the ciphered personalization data from being exposed and potentially being compromised. In an embodiment, the source code and the personalization data are combined prior to being ciphered. In an embodiment, the source code and the personalization data are separately ciphered. In an embodiment, any of a variety of ciphering techniques may be used to cipher the interoperable SPB, including, but not limited to: data encryption standard (DES), Rivest-Shamir-Adleman (RSA), blowfish, two fish, advanced encryption standard (AES), International Data Encryption Algorithm (IDEA), message digest 5 (MD5), hash-based message authentication code (HMAC), and so on.

Ciphering the interoperable SPB allows for the safe transport of the interoperable SPB to the Primary Platform. Ciphering the interoperable SPB is important to protect sensitive information associated with the Primary Platform, as well as private information associated with end users and subscriptions of the end users. The ciphered SPB can be readily transported to the Primary Platform with the security and integrity of the information included therein being ensured. Once at the Primary Platform, which is a secured environment, the ciphered SPB can be deciphered, granting access to contents of the interoperable SPB. A detailed discussion of the first phase in the transformation of the non-interoperable SPB is provided below.

In an embodiment, a second phase includes compiling the interoperable SPB to produce the native SPB executable on the Primary Platform. The second phase also includes deciphering the ciphered SPB to recover the interoperable SPB. Recovery of the interoperable SPB from the ciphered SPB also helps to ensure the integrity of the interoperable SPB, ensuring that the SPB has not been modified, for example. An inverse of the ciphering technique used to cipher the interoperable SPB may be used in recovery, for example. A detailed discussion of the second phase of the transformation of the non-interoperable SPB is provided below.

According to an example embodiment, a compiler that transforms the interoperable SPB into the native SPB is provided. Prior to compilation, the interoperable SPB is not ready to execute within the Primary Platform. The compiler compiles the interoperable SPB to produce the native SPB that can execute on the Primary Platform.

In an embodiment, the compiler is implemented as an ahead of time on-module compiler (AOC). The compilation of the interoperable SPB may be performed before the SPB is stored and executed, so resources do not need to be dedicated to the compiler at a time when resources are scarce, which may be the case when the SPB is to be executed. Compiling the interoperable SPB at a time while resources are scarce may negatively impact the performance of both the Primary Platform and the compiler. The compiler may be implemented at the operating system level (e.g., low-level operating system 109) so the compilation of the interoperable SPB is not affected by low performance or slowdowns.

In an embodiment, the compiler is implemented in SPBL 206 of iSSP 205. Being located in SPBL 206 of iSSP 205, the compiler is in a secure environment so sensitive information (such as information related to Primary Platform 105) remains protected. Hence the sensitive information is not exposed. Although the discussion focuses on the compiler being implemented in iSSP 205, the example embodiments are operable in an embedded SSP (eSSP) or any other form of SSP that supports the Primary Platform and Secondary Platform architecture. Therefore, the focus on iSSP 205 should not be construed as being limiting to the scope of the example embodiments.

In an embodiment, the compiler links the compiled source code with personalization data associated with a subscription of end user 215. The personalization data may define a final customization of the interoperable SPB. The linking of the personalization data associated with the subscription of end user 215 customizes the interoperable SPB to the subscription of end user 215, making the compiled SPB personalized to the subscription of end user 215. After linking, resources utilized may be released, freeing the resources to be used for other purposes.

Figure 3:
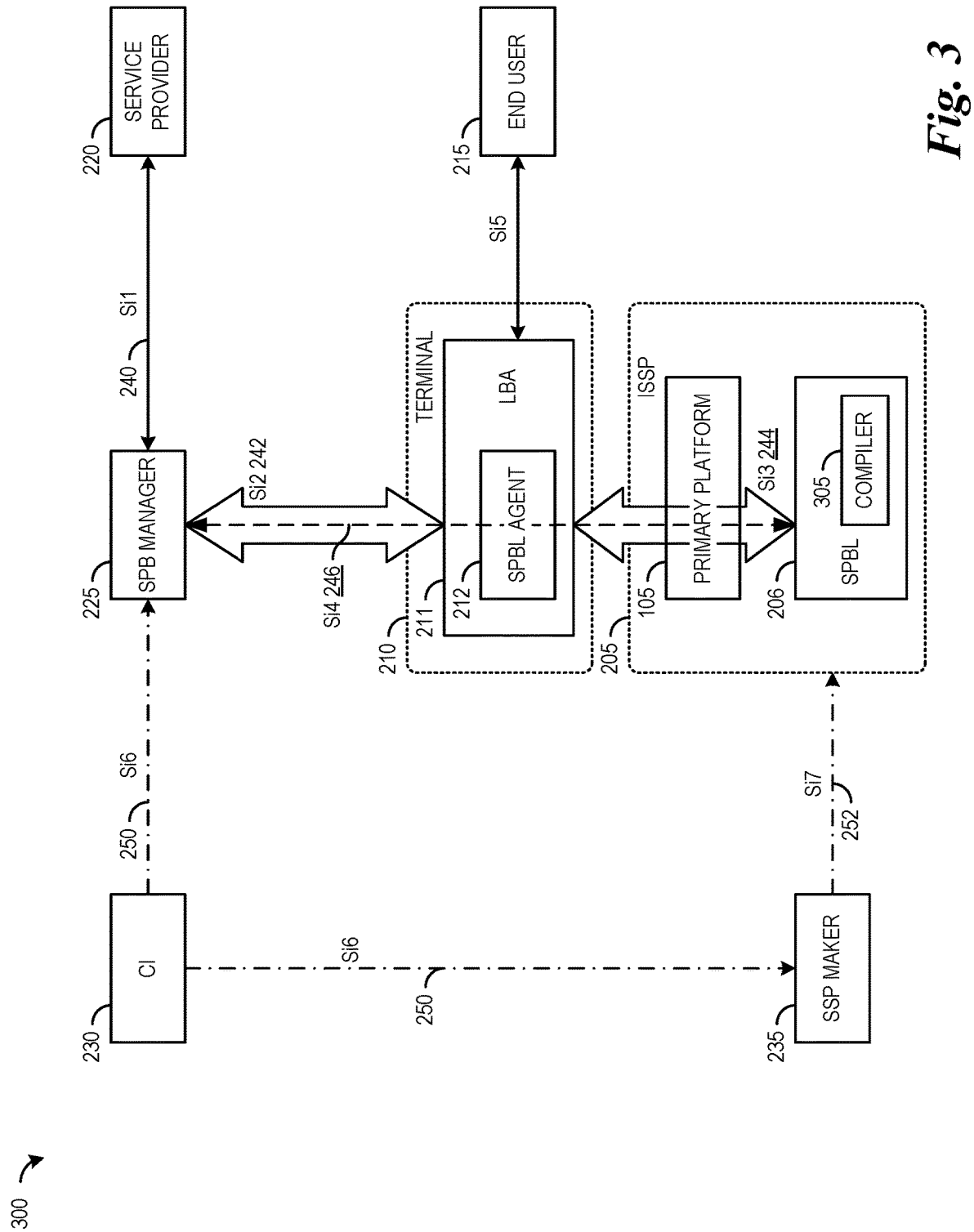
FIG. 3 illustrates a diagram of an example iSSP environment with support for platform interoperability according to an embodiment.

FIG. 3 illustrates a diagram of an example iSSP environment 300 with support for platform interoperability according to an embodiment. iSSP environment 300 includes a compiler 305 that transforms the interoperable SPB into the native SPB executable by Primary Platform 105. Compiler 305 is located in SPBL 206 of iSSP 205, for example. Although the discussion presented herein focusses on iSSP environment 300, the example embodiments presented herein are operable with other forms of SSPs that support the Primary Platform and Secondary Platform architecture. Therefore, the discussion of iSSPs should not be construed as being limiting to the scope of the example embodiments.

Compiler 305 compiles the interoperable SPB, originally non-interoperable with Primary Platform 105, into the native SPB that is compatible with and executable by Primary Platform 105. In an embodiment, compiler 305 compiles the source code (or tokenized logic) of the interoperable SPB into native code of Primary Platform 105. In an embodiment, compiler 305 also links the personalization data (or tokenized personalization data) associated with the subscription of end user 215 to the compiled source code. The compiling of the source code and the linking of the compiled source code and the personalization data customizes the native SPB to the subscription of end user 215. In an embodiment, compiler 305 compiles and links the source code and personalization data a priori to produce the native SPB and stores the native SPB in a memory or a server, where the native SPB can be retrieved at a later time for execution.

Figure 4:
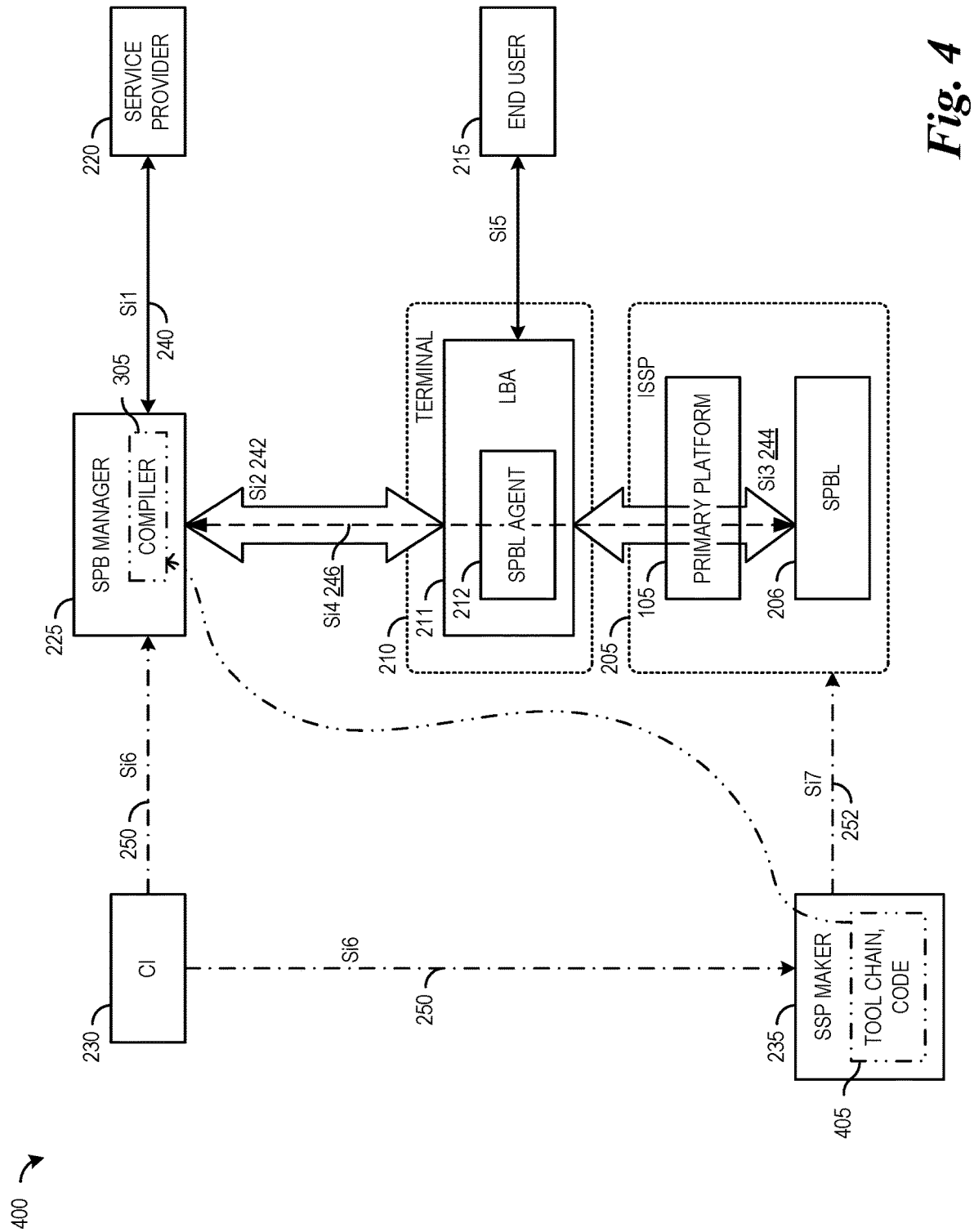
FIG. 4 illustrates a diagram of an example iSSP environment with support for platform interoperability, where the compiler is not located in the iSSP according to an embodiment.

FIG. 4 illustrates a diagram of an example iSSP environment 400 with support for platform interoperability, where compiler 305 is not located in iSSP 205 according to an embodiment. As shown in FIG. 4, compiler 305 is located in SPB Manager 225. SPB Manager 225 may be a logical location for compiler 305 because SPB Manager 225 is generally used to generate SPBs. Alternatively, compiler 305 may be located in an external server not shown in FIG. 4. As an example, compiler 305 may be located in a stand-alone server that is a part of iSSP environment 400.

Figure 5:
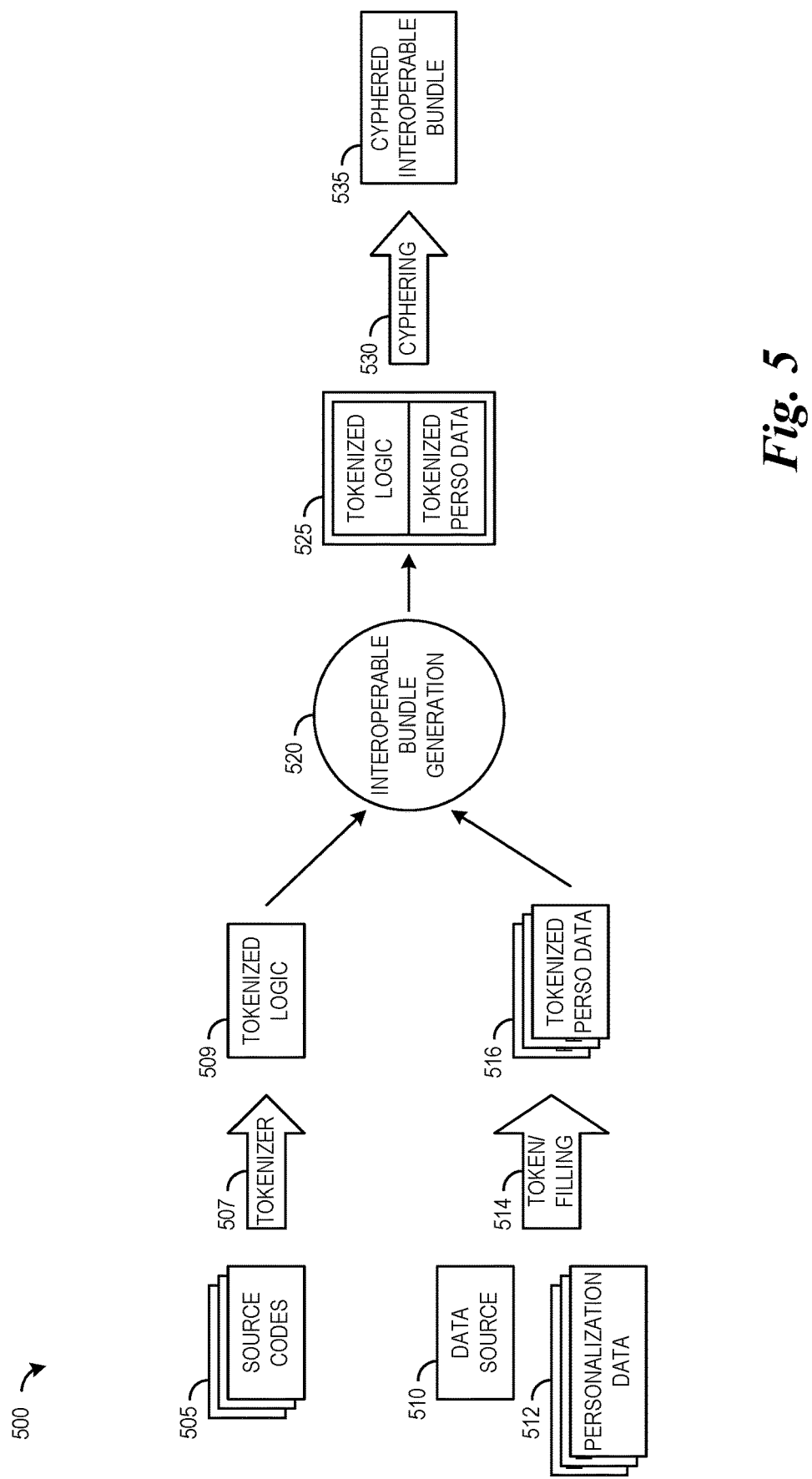
FIG. 5 illustrates a system displaying an example first phase of the multi-phase process for transforming a Secondary Platform Bundle (SPB) that is non-interoperable with the Primary Platform into the native SPB that is compatible with the Primary Platform according to an embodiment.

FIG. 5 illustrates a system 500 displaying an example first phase of the multi-phase process for transforming a SPB that is non-interoperable with the Primary Platform into the native SPB that is compatible with the Primary Platform according to an embodiment. The first phase of the multi-phase process includes the generation of the interoperable SPB meeting an interoperability scheme. The generation of the interoperable SPB also includes the tokenizing of the source code of the interoperable SPB and the personalization data associated with the interoperable SPB, as well as ciphering the interoperable SPB to protect the interoperable SPB. System 500 may take place in iSSP environment 300 or 400, for example. System 500 may also take place in other SSP environments that support the Primary Platform and Secondary Platform architecture.

The generation of the interoperable SPB includes the tokenization of source codes 505 of the interoperable SPB. The tokenization of source codes 505 includes the substitution of keywords of source codes 505 with specific tokens, for example. The tokenization of source codes 505 produces tokenized logic 509. The tokenization may be performed by a tokenizer 507. In an embodiment, a single set of tokens is used in the substitution of the keywords, even in the situation where there are multiple source codes 505. In an embodiment, multiple sets of tokens are used in the substitution of the keywords, with one set of tokens per source code, for example. Alternatively, instead of tokens, bytecode is used to substitute the keywords of source codes 505 with compact numeric codes, constants, or references. In addition the bytecode solution implies the definition of a specific bytecode format.

The generation of the interoperable SPB also includes the tokenization and filling of data sources 510 and personalization data 512. Data sources 510 may be source code that operates as a container to store personalization data 512 associated with subscriptions that defines a final customization of the interoperable SPB. The tokenization and filling introduces personalization data 512 to data source 510 to produce tokenized personalization data 518. The tokenization and filling may operate in a similar manner to the tokenization of source codes 505, where keywords of personalization data 512 are substituted with specific tokens. The tokens used in tokenization and filling of personalization data 512 may be different from the tokens used in tokenization of source codes 505. The tokenization and filling may be performed by a token/filling unit 514. In an embodiment, tokenization and tokenization and filling are optional.

Tokenized logic 509 and tokenized personalization data 516 (tokenized personalization data is shown as "tokenized perso data" to simplify the figure) are combined to generate interoperable SPB 525. The generation of interoperable SPB 525 may be performed by a generator 520, for example. Tokenized logic 509 and tokenized personalization data 516 may be concatenated to generate interoperable SPB 525, for example. Alternatively, tokenized logic 509 and tokenized personalization data 516 may simply be placed into a container (i.e., interoperable SPB 525). In an embodiment, source codes 605 and personalization data 512 are not tokenized. In such an embodiment, source codes 605 and personalization data 512 may be combined to generate interoperable SPB 525.

Interoperable SPB 525 may be ciphered to produce a ciphered interoperable SPB 535. Interoperable SPB 525 may be ciphered utilizing any ciphering technique, including, but not limited to: DES, RSA, blowfish, two fish, AES, IDEA, MD5, HMAC, and so on. The ciphering of interoperable SPB 525 may be performed by a ciphering unit 530, for example. Ciphered interoperable SPB 535 may be saved in a memory or a server prior to transport to SPBL 206 or another entity of iSSP environment 300 or 400. In a situation when there is no need to protect the interoperable SPB it may not be necessary to cipher interoperable SPB 525.

Figure 6:
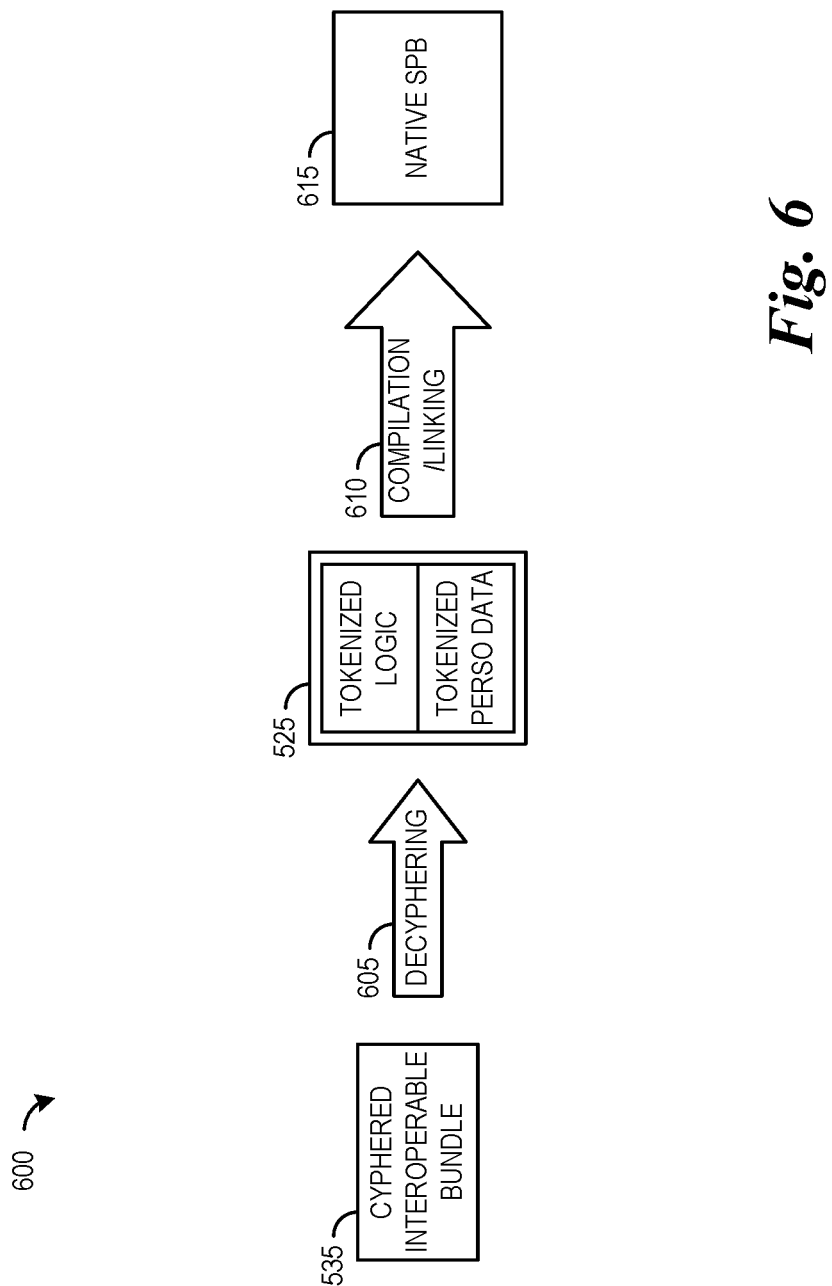
FIG. 6 illustrates a system displaying an example second phase of the multi-phase process for transforming a SPB that is non-interoperable with the Primary Platform into the native SPB that is compatible with the Primary Platform according to an embodiment.

FIG. 6 illustrates a system 600 displaying an example second phase of the multi-phase process for transforming a SPB that is non-interoperable with the Primary Platform into the native SPB that is compatible with the Primary Platform according to an embodiment. The second phase of the multi-phase process includes the compiling and linking of the interoperable SPB to produce the native SPB executable on the Primary Platform. The compiling and linking of the native SPB also includes the deciphering of the ciphered interoperable SPB to recover the interoperable SPB.

Compiling and linking interoperable SPB 525 includes deciphering ciphered interoperable SPB 535. Ciphered interoperable SPB 535 may be received from SPB Manager 225, which generated ciphered interoperable SPB 535, for example. As an example, SPB Manager 225 transports ciphered interoperable SPB 535 over Si2interface 242. Deciphering ciphered interoperable SPB 535 may be performed by deciphering circuit 605 using an inverse of a cipher technique discussed above, including, but not limited to: DES, RSA, blowfish, two fish, AES, IDEA, MD5, HMAC, and so on. As discussed above, in a secured environment, it may not have been necessary to cipher interoperable SPB 525. In such a situation, compiling interoperable SPB 525 may not include a deciphering operation.

Deciphering ciphered interoperable SPB 535 by deciphering unit 605 produces interoperable SPB 525. Interoperable SPB 525 comprises tokenized logic 509 and tokenized personalization data 516.

Interoperable SPB 525 is compiled and linked to produce native SPB 615. In an embodiment, tokenized logic 509 is compiled to produce native logic compatible with Primary Platform 105. The native logic is linked with tokenized personalization data 516 to produce native SPB 615. Linking the native logic with tokenized personalization data 516 customizes the native logic with information associated with subscriptions of end user 215. Native SPB 615 may be saved in a memory or a server, where it can be recalled prior to execution.

The compiling and linking of interoperable SPB 525 may be performed by compiler 305. As discussed previously, compiler 305 may be located in SPBL 206 or another entity of iSSP environment 300 or 400, such as SPB Manager 225.

In an embodiment, the compiling and linking of interoperable SPB 525 occurs a priori and the resulting native SPB 615 is stored in memory or server for subsequent execution. The compiling and linking occurring a priori enables the compiling and linking to take place when there are free resources available. As a contrast, compiling and linking on an as needed basis may result in a condition where the compiling and linking of interoperable SPB 525 is needed when there are no free resources available. In such a situation, resources may have to be taken away from performing other tasks and re-assigned to the compiling and linking of interoperable SPB 525. This may negatively impact the performance of the compiling and linking (e.g., the compiling and linking has to wait until the resources become available), as well as the performance of the other tasks (which has to release the resources to be reassigned to perform compiling and linking).

In an embodiment, progressive compilation is performed. In progressive compilation, atomic units for compiling and linking are defined. For each atomic unit, operations to be performed may include deciphering, compiling, and linking, for example. The atomic units may be scheduled and performed individually, rather than as a single unit comprising deciphering, compiling, and linking. The single operations may then be more efficiency scheduled and performed. As an example, pipelined processing of the atomic units may be performed. As another example, the tokenized entities (e.g., tokenized logic 509 and tokenized personalization data 516) may be sorted in accordance with their dependencies and then executed based on the sort. The execution may be scheduled so that the tokenized entities only depend on previous tokenized entities.

Figure 7:
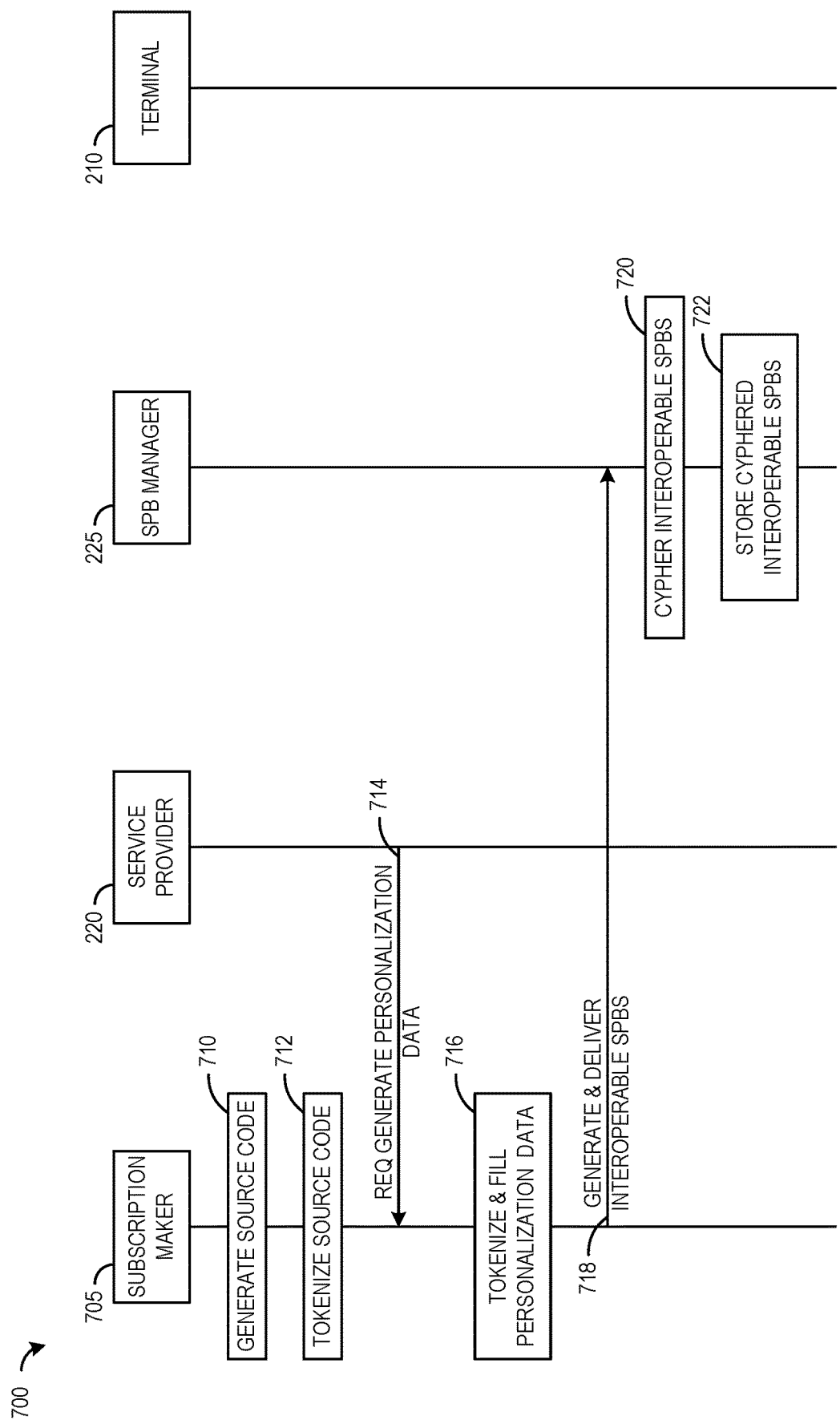
FIG. 7 illustrates a diagram of operations and communications performed by entities participating in the first phase of the multi-phase process for transforming a SPB that is non-interoperable with the Primary Platform into a native SPB that is compatible with the Primary Platform according to an embodiment.

FIG. 7 illustrates a diagram 700 of operations and communications performed by entities participating in the first phase of the multi-phase process for transforming a SPB that is non-interoperable with the Primary Platform into a native SPB that is compatible with the Primary Platform according to an embodiment. The first phase of the multi-phase process includes the generation of the interoperable SPB meeting an interoperability scheme. The entities participating in the first phase include a subscription maker 705, a service provider 220, SPB Manager 225, and terminal 210.

The first phase of the multi-phase process includes subscription maker 705 generating source code of the SPB (block 710). The source code for the SPB comprises code implementing the SSP applications and operating system of the SPB. The source code for the SPB is compatible with Secondary Platform 120 and not Primary Platform 105. Each distinct SSP application may have its own source code.

Subscription maker 705 tokenizes the source code (block 712). Tokenizing the source code produces tokenized logic. As discussed previously, tokenizing the source code involves substituting keywords of the source code with specific tokens. An advantage of tokenization is a reduction in the size of the source code. As an alternative to tokenizing, bytecode is used to substitute for keywords of the source code. Tokenizing may be optional.

Service provider 220 queries or requests subscription maker 705 to generate personalization data (event 714). The personalization data may be related to subscriptions of end user 215. Each subscription of end user 215 may have an associated personalization data. Subscription maker 705 tokenizes and fills the personalization data (block 716). Tokenizing and filling the personalization data produces tokenized personalization data. Tokenizing and filling of the personalization data introduces the personalization data to data sources serving as containers storing the personalization data. The tokenizing and filling of the personalization data may be similar to the tokenizing of the source codes, where keywords of the personalization data are substituted with specific tokens. The tokens used in tokenization and filling of the personalization data may be different from the tokens used in tokenization of the source codes. The tokenizing and filling may be optional.

Subscription maker 705 generates and delivers interoperable SPBs (event 718). Subscription maker 705 generates the interoperable SPBs by combining the tokenized logic and the tokenized personalization data. The tokenized logic and the tokenized personalization data may be concatenated or simply placed in a container, for example. Subscription maker 705 delivers the interoperable SPBs to SPB Manager 225, for example.

SPB Manager 225 ciphers the interoperable SPBs received from subscription maker 705 (block 720). SPB Manager 225 may make use of any ciphering technique to cipher to interoperable SPBs. SPB Manager 225 stores the ciphered interoperable SPB (event 722). The ciphered interoperable SPBs may be stored for subsequent delivery to terminal 210. The ciphered interoperable SPBs may be stored in a memory or a server, for example. In an embodiment, along with the ciphered interoperable SPBs, SPB Manager 225 may store a subset of the personalization data or indexing information derived from the subset of the personalization data. The subset of the personalization data or the indexing information may be used to search for and retrieve the ciphered interoperable SPBs. For example, the memory or server may be searched based on the subscription of end user 215 to find the related ciphered interoperable SPB.

Figure 8:
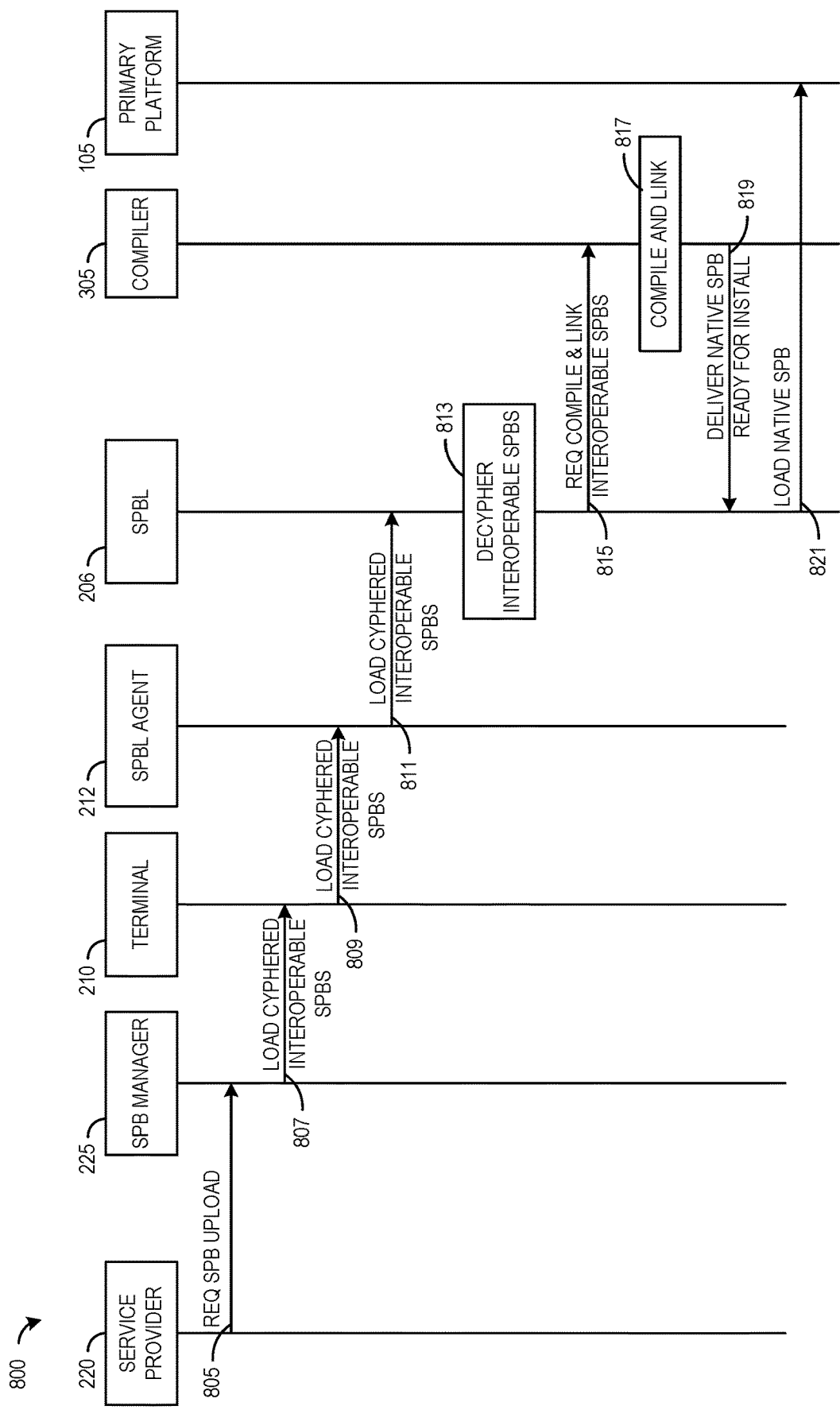
FIG. 8 illustrates a diagram of operations and communications performed by entities participating in the second phase of the multi-phase process for transforming a SPB that is non-interoperable with the Primary Platform into a native SPB that is compatible with the Primary Platform according to an embodiment.

FIG. 8 illustrates a diagram 800 of operations and communications performed by entities participating in the second phase of the multi-phase process for transforming an interoperable SPB into a native SPB that is compatible with the Primary Platform according to an embodiment. The second phase of the multi-phase process includes the compiling and linking of the interoperable SPB to produce the native SPB executable on the Primary Platform. The entities participating in the second phase include service provider 220, SPB Manager 225, terminal 210, SPBL agent 212, SPBL 206, compiler 305, and Primary Platform 105.

The second phase of the multi-phase process includes service provider 220 sending a request for SPB upload to SPB Manager 225 (event 805). The request for SPB upload may be a request from service provider 220 to have a ciphered interoperable SPB associated with a subscription of end user 215 to be loaded onto terminal 210 being used or potentially being used by end user 215. The request for SPB upload may be sent to SPB Manager 225 over Si1 interface 240, for example.

The request for SPB upload may be triggered by end user 215 initiating an application or a service request, for example. The memory or server, where the ciphered interoperable SPBs are stored, may be searched and the related ciphered interoperable SPB retrieved. The request for SPB upload may result in SPB Manager 225 loading the related ciphered interoperable SPB onto terminal 210. The related ciphered interoperable SPB being a ciphered interoperable SPB that was generated specifically for the subscription of end user 215. In other words, the related ciphered interoperable has been customized with the personalization data of the subscription of end user 215.

SPB Manager 225 retrieves the related ciphered interoperable SPB from memory or server and uploads the ciphered interoperable SPB onto terminal 210 (event 807). The ciphered interoperable SPB may be delivered or loaded to terminal 210 over Si2 interface 242. Terminal 210 delivers or loads the ciphered interoperable SPB to SPBL Agent 212 (event 809). Because the integrity of the ciphered interoperable SPB is protected by the cipher, sensitive information included in the ciphered interoperable SPB is hidden from prying eyes or malicious agents.

SPBL agent 212 delivers or loads the ciphered interoperable SPB to the SPBL 206 (event 811). SPBL agent 212 may deliver the ciphered interoperable SPB onto SPBL 206 as SPBL agent 212 receives the ciphered interoperable SPB. Alternatively, SPBL agent 212 may indicate to SPBL 206 that SPBL agent 212 has received the ciphered interoperable SPB for SPBL 206 and SPBL 206 may respond, requesting delivery of the ciphered interoperable SPB. As yet another alternative, SPBL agent 212 may wait and deliver the ciphered interoperable SPB only at specified times (e.g., periodic delivery) or once a specified number of ciphered interoperable SPBs for SPBL 206 have been received. The ciphered interoperable SPB may be delivered to SPBL 206 over Si3 interface 244, for example.

SPBL 206 deciphers the ciphered interoperable SPB (block 813). SPBL 206 may use an inverse of the cipher technique used to cipher the interoperable SPB to decipher the ciphered interoperable SPB, for example. Deciphering the ciphered interoperable SPB produces the interoperable SPB, which comprises tokenized logic and tokenized personalization data. SPBL 206 requests the compiling and linking of the interoperable SPB (event 815).

SPBL 206 may request the compiling and linking of the interoperable SPB by sending a request to compiler 305. In an embodiment where compiler 305 is located in SPBL 206, SPBL 206 may assert a specified value on a flag or assert an interrupt to request the compiling and linking of the interoperable SPB, for example.

Compiler 305 compiles the interoperable SPB (block 817). Compiling the interoperable SPB includes compiling the tokenized logic to produce native logic that is executable by Primary Platform 105, and linking the tokenized personalization data to the native logic. The linking of the tokenized personalization data to the native logic customizes the native logic with information associated with subscriptions of end user 215. Compiling the interoperable SPB results in the native SPB. Compiler 305 delivers the native SPB (event 819). The native SPB is delivered to SPBL 206, for example. In an embodiment where compiler 305 is part of SPBL 206, compiler 305 asserts a specified value on a flag or asserts an interrupt to indicate the native SPB has been generated. In an embodiment where compiler 305 is part of a different entity (e.g., SPB Manager 225), compiler 305 may send an indication to SPBL 206 to indicate that the native SPB has been generated. Compiler 305 may also send the native SPB to SPBL 206. Alternatively, the native SPB is saved into memory or server and SPBL 206 retrieves the native SPB as needed.

SPBL 206 loads the native SPB (event 821). SPBL 206 loads the native SPB onto Primary Platform 105. In the situation where the native SPB is stored local to SPBL 206, SPBL 206 may load the native SPB onto Primary Platform 105 by sending the native SPB to Primary Platform 105. In the situation where the native SPB is stored at a remote memory or server, SPBL 206 may load the native SPB onto Primary Platform 105, after retrieving the native SPB.

Figure 9:
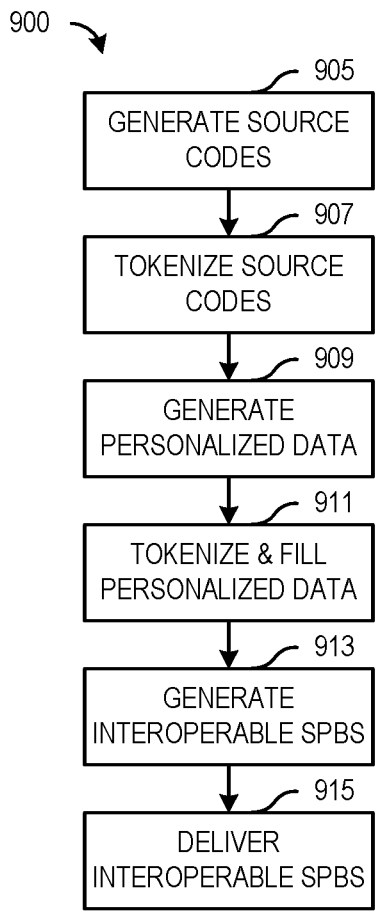
FIG. 9 illustrates a flow diagram of example operations occurring in a subscription maker participating in the first phase of the multi-phase process for transforming a SPB that is non-interoperable with the Primary Platform into the native SPB that is compatible with the Primary Platform according to an embodiment.

FIG. 9 illustrates a flow diagram of example operations 900 occurring in subscription maker 705 participating in the first phase of the multi-phase process for transforming a SPB that is non-interoperable with the Primary Platform into the native SPB that is compatible with the Primary Platform according to an embodiment.

Operations 900 begin with subscription maker 705 generating source codes for the SPB (block 905). The source codes of the SPB are the code implementations of the high-level operating system of Secondary Platform. Hence, the source codes of the SPB are non-interoperable with the Primary Platform. Subscription maker 705 tokenizes the source codes (block 907). The tokenization of the source code includes the substitution of keywords of the source codes with specific tokens, for example. The tokenization of the source codes produces tokenized logic. Alternatively, a bytecode is used to encode the keywords of the source code. When bytecode is used, the keywords are replaced with compact numeric codes, constants, or references. Tokenization may be optional.

Subscription maker 705 receives a request to generate personalization data (block 909). The input may be received from service provider 220, for example. The personalization data may define a final customization of the interoperable SPB. Subscription maker 705 tokenizes and fills the personalization data (block 911). Tokenizing and filling of the personalization data introduces the personalization data to data sources serving as containers storing the personalization data. The tokenizing and filling of the personalization data may be similar to the tokenizing of the source codes, where keywords of the personalization data are substituted with specific tokens. The tokenized and filled personalization data are referred to as tokenized personalization data. Tokenizing and filling may be optional.

Subscription maker 705 generates the interoperable SPBs (block 913). The interoperable SPBs may be generated by combining the tokenized logic and the tokenized personalization data. The tokenized logic and the tokenized personalization data may be combined by concatenation, for example. In the situation where tokenizing and tokenizing and filling are not performed, the interoperable SPBs are generated from the source codes and the personalization data. Subscription maker 705 delivers the interoperable SPBs (block 915). Subscription maker 705 delivers the interoperable SPBs to SPB Manager 225, for example.

Figure 10:
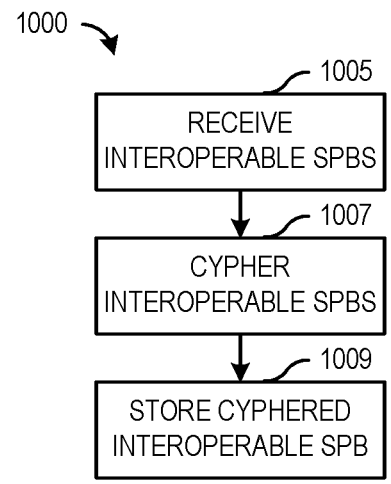
FIG. 10 illustrates a flow diagram of example operations occurring in a SPB Manager participating in the first phase of the multi-phase process for transforming a SPB that is non-interoperable with the Primary Platform into the native SPB that is compatible with the Primary Platform according to an embodiment.

FIG. 10 illustrates a flow diagram of example operations 1000 occurring in SPB Manager 225 participating in the first phase of the multi-phase process for transforming a SPB that is non-interoperable with the Primary Platform into the native SPB that is compatible with the Primary Platform according to an embodiment.

Operations 1000 begin with SPB Manager 225 receiving the interoperable SPBs (block 1005). The interoperable SPBs may be received from subscription maker 705, for example. SPB Manager 225 ciphers the interoperable SPBs (block 1007). Ciphering the interoperable SPBs protects the contents of the interoperable SPBs from malicious characters and unintended recipients. SPB Manager 225 may use any of a range of cipher techniques to cipher the interoperable SPBs. SPB Manager 225 stores the ciphered interoperable SPBs (block 1009). The ciphered interoperable SPBs may be stored for subsequent delivery to SPB Loader 206. The ciphered interoperable SPBs may be stored in a memory or a server, for example. In an embodiment, along with the ciphered interoperable SPBs, SPB Manager 225 may store a subset of the personalization data or indexing information derived from the subset of the personalization data. The subset of the personalization data or the indexing information may be used to search for and retrieve the ciphered interoperable SPBs. For example, the memory or server may be searched based on the subscription of end user 215 to find a related ciphered interoperable SPB.

Figure 11:
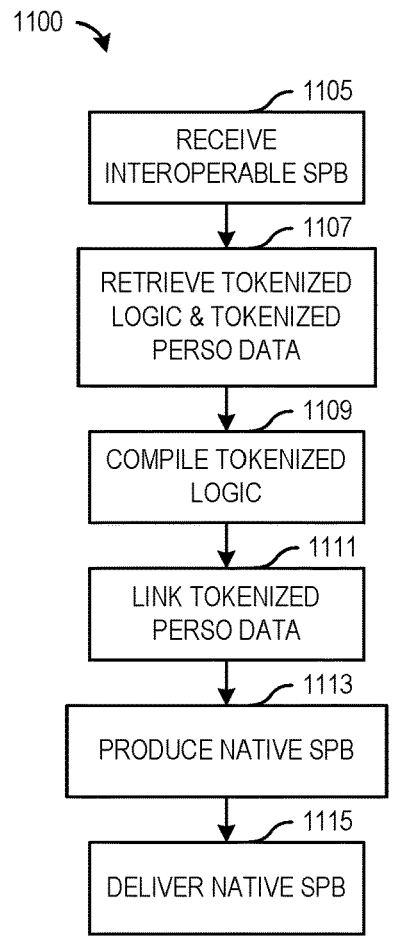
FIG. 11 illustrates a flow diagram of example operations occurring in a compiler participating in the second phase of the multi-phase process for transforming a SPB that is non-interoperable with the Primary Platform into the native SPB that is compatible with the Primary Platform according to an embodiment.

FIG. 11 illustrates a flow diagram of example operations 1100 occurring in compiler 305 participating in the second phase of the multi-phase process for transforming a SPB that is non-interoperable with the Primary Platform into the native SPB that is compatible with the Primary Platform according to an embodiment.

Operations 1100 begin with compiler 305 receiving the interoperable SPBs (block 1105). The interoperable SPBs may be received from SPBL 206, which deciphered the ciphered interoperable SPBs. Compiler 305 retrieves tokenized logic and the tokenized personalization data from the interoperable SPBs (block 1107). The tokenized logic and the tokenized personalization data may be concatenated together in the interoperable SPBs, for example.

Compiler 305 compiles the tokenized logic (block 1109). Compiling the tokenized logic produces native logic that is executable by the Primary Platform. Compiler 305 links the tokenized personalization data to the native logic (block 1111). The linking of the tokenized personalization data to the native logic customizes the native logic with information associated with subscriptions of end user 215. Compiling the tokenized logic and linking the tokenized personalization data produces the native SPB (block 1113). The native SPB is delivered (block 1115). The native SPB is delivered to SPBL 206, for example. In an embodiment where compiler 305 is part of SPBL 206, compiler 305 asserts a specified value on a flag or asserts an interrupt to indicate the native SPB has been generated. In an embodiment where compiler 305 is part of a different entity (e.g., SPB Manager 225), compiler 305 may send an indication to SPBL 206 to indicate that the native SPB has been generated. Compiler 305 may also send the native SPB to SPBL 206. Alternatively, the native SPB is saved into memory or server and SPBL 206 retrieves the native SPB as needed.

Figure 12:
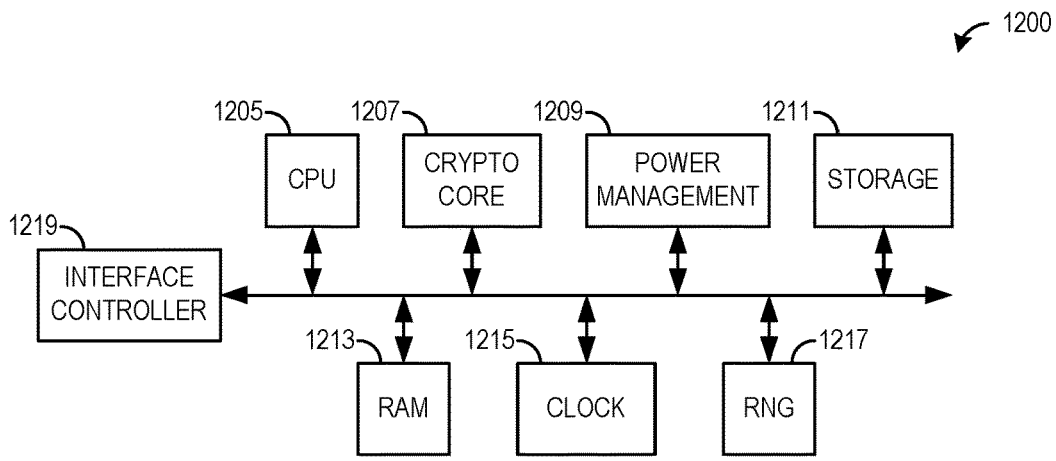
FIG. 12 illustrates an example SSP according to an embodiment.

FIG. 12 illustrates an example SSP 1200 according to an embodiment. SSP 1200 may include the methods and apparatus disclosed herein. For example, SSP 1200 may include a SPBL with compiler to compile and link interoperable SPBs to produce native SPBs executable on the Primary Platform.

Specific SSPs may utilize all of the components show or only a subset of the components, and levels of integration may vary from device to device. Furthermore, a specific SSP may contain multiple instances of a component, such as multiple central processing units (CPUs), memories, I/O interfaces, etc. SSP 1200 includes a CPU 1205, a crypto core 1207 configured to cipher or decipher information, a power management circuit 1209 configured to control power consumption of SSP 1200, and storage 1211 to store native SPBs, for example. SSP 1200 also includes random access memory (RAM) 1213 for storing executing programs and data, a clock 1215, and a random number generator (RNG) 1217 configured to generate random values, for ciphering or deciphering, for example. An interface controller 1219 is configured to support communication into and out of SSP 1200. Interface controller 1219 supports communication over wired links, such as an Ethernet cable, or wireless links to access nodes or different networks, or wireless links, such as over any of a range of radio access networks (RANs).

Although shown as a single unit, CPU 1205 may be implemented as multiple processing units. CPU 1205 may be configured to support compiling and linking of tokenized logic and tokenized personalization data to generate native SPBs that are executable on the Primary Platform.

Example embodiments of the invention are summarized here. Other embodiments can also be understood from the entirety of the specification as well as the claims filed herein.

Example 1. A method including: compiling, by a compiler of a Smart Secure Platform (SSP) supporting a Primary Platform and a Secondary Platform, source code including an implementation of an operating system of the Secondary Platform and applications of the Secondary Platform, to produce compiled source code compatible by an operating system of the Primary Platform; linking, by the compiler, personalization data to the compiled source code to produce a native Secondary Platform Bundle (SPB) compatible with the Primary Platform, the personalization data being associated with a subscription of a user of the SSP; and delivering, by the compiler, the native SPB.

Example 2. The method of example 1, further including: receiving, by the compiler, an interoperable SPB including the source code and the personalization data.

Example 3. The method of one of examples 1 or 2, where the operating system of the Secondary Platform and the operating system of the Primary Platform are non-interoperable.

Example 4. The method of one of examples 1 to 3, where the compiler includes an on-module compiler.

Example 5. The method of one of examples 1 to 4, where the on-module compiler is implemented in a SPB Loader (SPBL) of the SSP.

Example 6. The method of one of examples 1 to 5, where the source code includes tokenized source code.

Example 7. The method of one of examples 1 to 6, where the personalization data (512) includes tokenized and filled personalization data of the subscription of the user.

Example 8. The method of one of examples 1 to 7, where the source code and the personalization data meet an interoperability scheme.

Example 9. A method including: tokenizing, by a subscription maker, source code including an implementation of an operating system an implementation of an operating system of a Secondary Platform and applications of the Secondary Platform to produce tokenized source code; tokenizing and filling, by the subscription maker, personalization data associated with a subscription of a user of a Smart Secure Platform (SSP) supporting the Primary Platform and the Secondary Platform, thereby producing tokenized personalization data; generating, by the subscription maker, an interoperable Secondary Platform Bundle (SPB) in accordance with the tokenized source code and the tokenized personalization data, the interoperable SPB meeting an interoperability scheme for the Secondary Platform and a Primary Platform; and delivering, by the subscription maker, the interoperable SPB.

Example 10. The method of example 9, further including: generating, by the subscription maker, the source code.

Example 11. The method of one of examples 9 or 10, the interoperable SPB being delivered to a SPB Manager.

Example 12. The method of one of examples 9 to 11, where the Primary Platform and the interoperable SPB are non-interoperable.

Example 13. The method of one of examples 9 to 12, where tokenizing the source code includes substituting keywords of the source code with tokens.

Example 14. The method of one of examples 9 to 13, where tokenizing the source code includes substituting keywords of the source code with bytecode.

Example 15. A Smart Secure Platform (SSP) supporting a Primary Platform and a Secondary Platform, the SSP including: one or more processors; and a non-transitory memory storage including instructions that, when executed by the one or more processors, cause the SSP to: compile source code including an implementation of an operating system of the Secondary Platform and applications of the Secondary Platform to produce compiled source code compatible by an operating system of the Primary Platform; link personalization data to the compiled source code to produce a native Secondary Platform Bundle (SPB) compatible with the Primary Platform, the personalization data being associated with a subscription of a user of the SSP; and deliver the native SPB.

Example 16. The SSP of example 15, the instructions further causing the SSP to receive an interoperable SPB including the source code and the personalization data.

Example 17. The SSP of one of examples 15 to 16, where the operating system of the Secondary Platform and the operating system of the Primary Platform are non-interoperable.

Example 18. The SSP of one of examples 15 to 17, where the source code includes tokenized source code.

Example 19. The SSP of one of examples 15 to 18, where the personalization data includes tokenized and filled personalization data of the subscription of the user.

Example 20. The SSP of one of examples 15 to 19, where the source code and the personalization data meet an interoperability scheme.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A method comprising:
tokenizing, by a subscription maker, source code comprising an implementation of an operating system of a Secondary Platform and applications of the Secondary Platform to produce tokenized source code;
tokenizing and filling, by the subscription maker, personalization data associated with a subscription of a user of a Smart Secure Platform (SSP) supporting a Primary Platform and the Secondary Platform to produce tokenized personalization data;
generating, by the subscription maker, an interoperable Secondary Platform Bundle (SPB) in accordance with the tokenized source code and the tokenized personalization data, the interoperable Secondary Platform Bundle meeting an interoperability scheme for the Secondary Platform and the Primary Platform;
delivering, by the subscription maker, the interoperable Secondary Platform Bundle; and
ciphering the interoperable Secondary Platform Bundle and saving the ciphered Secondary Platform Bundle in a memory or server.

2. The method of claim 1, further comprising generating, by the subscription maker, the source code.

3. The method of claim 1, the interoperable Secondary Platform Bundle being delivered to a Secondary Platform Bundle Manager.

4. The method of claim 1, wherein the Primary Platform and the interoperable Secondary Platform Bundle are non-interoperable.

5. The method of claim 1, wherein tokenizing the source code comprises substituting keywords of the source code with tokens or bytecode.

6. A method comprising:
compiling, by a compiler of a Smart Secure Platform (SSP) supporting a Primary Platform and a Secondary Platform, source code to produce compiled source code compatible with an operating system of the Primary Platform, the source code comprising an implementation of an operating system of the Secondary Platform and applications of the Secondary Platform;

linking, by the compiler, personalization data to the compiled source code to produce a native Secondary Platform Bundle (SPB) compatible with the Primary Platform, the personalization data associated with a subscription of a user of the Smart Secure Platform, wherein producing the native Secondary Platform Bundle comprises:
- storing a ciphered Secondary Platform Bundle in a memory or a server; and
- deciphering the ciphered Secondary Platform Bndle after retrieving it from the memory or the server; and delivering, by the compiler, the native Secondary Platform Bundle.

7. The method of claim 6, further comprising receiving, by the compiler, an interoperable Secondary Platform Bundle comprising the source code and the personalization data.

8. The method of claim 6, wherein the operating system of the Secondary Platform and the operating system of the Primary Platform are non-interoperable.

9. The method of claim 6, wherein the compiler includes an on-module compiler, wherein the on-module compiler is implemented in an SPB Loader (SPBL) of the Smart Secure Platform.

10. The method of claim 6, wherein the personalization data includes tokenized and filled personalization data of the subscription of the user.

11. The method of claim 6, wherein the source code and the personalization data meet an interoperability scheme.

12. The method of claim 6, wherein keywords of the source code are substituted with tokens or bytecode.

13. A Smart Secure Platform (SSP) supporting a Primary Platform and a Secondary Platform, the Smart Secure Platform comprising:
- one or more processors; and
- a non-transitory memory storage coupled to the one or more processors, the non-transitory memory storage comprising instructions that, when executed by the one or more processors, cause the Smart Secure Platform to:
  - compile source code to produce compiled source code compatible with an operating system of the Primary Platform, the source code being tokenized, the source code comprising an implementation of an operating system of the Secondary Platform and applications of the Secondary Platform;
  - link personalization data to the compiled source code to produce a native Secondary Platform Bundle (SPB) compatible with the Primary Platform, the personalization data associated with a subscription of a user of the Smart Secure Platform, wherein producing the native Secondary Platform Bundle comprises:
    - storing a ciphered Secondary Platform Bundle in a memory or a server, and
    - deciphering the ciphered Secondary Platform Bundle after retrieving it from the memory or the server; and
  - deliver the native Secondary Platform Bundle.

14. The Smart Secure Platform of claim 13, wherein the instructions, when executed by the one or more processors, cause the Smart Secure Platform to receive an interoperable Secondary Platform Bundle comprising the source code and the personalization data.

15. The Smart Secure Platform of claim 13, wherein the operating system of the Secondary Platform and the operating system of the Primary Platform are non-interoperable.

16. The Smart Secure Platform of claim 13, wherein the personalization data includes tokenized and filled personalization data of the subscription of the user.

17. The Smart Secure Platform of claim 16, wherein the source code and the personalization data are combined by concatenation.

18. The Smart Secure Platform of claim 13, wherein the source code and the personalization data meet an interoperability scheme.

19. The Smart Secure Platform of claim 13, further comprising an on-module compiler, implemented in an SPB Loader (SPBL) of the Smart Secure Platform.

20. The Smart Secure Platform of claim 13, further comprising a power management circuit configured to control power consumption of the Smart Secure Platform.

* * * * *